United States Patent [19]

Markevka et al.

[11] Patent Number: 4,808,255

[45] Date of Patent: Feb. 28, 1989

[54] THERMALLY STABLE REACTIVE HOT MELT URETHANE ADHESIVE COMPOSITION HAVING A THERMOPLASTIC POLYMER, A COMPATIBLE, CURING URETHANE POLYESTER POLYOL PREPOLYMER AND A TACKIFYING AGENT

[75] Inventors: Virginia C. Markevka, Maplewood; John M. Zimmel, St. Paul; Elizabeth R. Messman, Minneapolis; William L. Bunnelle, Stillwater; Jeffrey M. Swoboda, White Bear Lake, all of Minn.

[73] Assignee: H. B. Fuller Company, St. Paul, Minn.

[21] Appl. No.: 47,685

[22] Filed: May 7, 1987

[51] Int. Cl.$^4$ .............................................. C09J 5/02
[52] U.S. Cl. ........................... 156/307.3; 156/331.4; 525/127; 525/130; 525/440; 525/451; 525/455
[58] Field of Search ................... 156/307.3, 331.4; 525/127, 130, 440, 455, 451

[56] References Cited

U.S. PATENT DOCUMENTS

| | | |
|---|---|---|
| 2,432,148 | 12/1909 | Furness et al. . |
| 3,108,083 | 10/1963 | Laganis . |
| 3,267,063 | 8/1966 | Hudson . |
| 3,437,622 | 4/1969 | Dahl . |
| 3,488,302 | 1/1970 | Pyron . |
| 3,509,232 | 4/1970 | Schollenberger . |
| 3,671,301 | 6/1972 | Dahl . |
| 3,829,533 | 8/1974 | Matsui et al. . |
| 3,914,484 | 10/1975 | Creegan et al. . |
| 3,931,077 | 1/1976 | Uchigaki et al. ................. 525/130 |
| 3,935,144 | 1/1976 | Hagenweiler et al. . |
| 3,935,338 | 1/1976 | Robertson . |
| 3,970,717 | 7/1976 | Muller-Albrecht et al. . |
| 4,013,806 | 3/1977 | Volkert et al. . |
| 4,021,391 | 5/1978 | Ijichi et al. . |
| 4,066,600 | 1/1978 | Pletcher et al. . |
| 4,151,345 | 4/1979 | Hillegass . |
| 4,165,307 | 8/1979 | Mizuno et al. . |
| 4,205,018 | 5/1980 | Nagasawa et al. . |
| 4,217,254 | 8/1980 | Legue ................................ 525/130 |
| 4,279,801 | 7/1981 | Kramer et al. . |
| 4,352,858 | 10/1982 | Stanley . |
| 4,390,678 | 6/1983 | LaBelle et al. . |
| 4,412,033 | 10/1983 | LaBelle et al. ..................... 524/590 |
| 4,423,179 | 12/1983 | Guagliarso ......................... 525/440 |
| 4,515,933 | 5/1985 | Chang ................................. 528/57 |

FOREIGN PATENT DOCUMENTS

| | | |
|---|---|---|
| 1077352 | 5/1980 | Canada . |
| 0199445 | 7/1986 | European Pat. Off. . |
| 1081705 | 8/1964 | United Kingdom . |
| 2137638A | 4/1983 | United Kingdom . |

OTHER PUBLICATIONS

One-Package Adhesives from m- and p- TMXDI, published by CYANAMID, Polymer Chemicals Department, Dynamit Nobel Technical Bulletin, *Dynacoll* ® and *Dynapol* ®.
U.S.I. Chemicals Technical Bulletin, *U.S. I. Chemicals Adhesive and Coatings Resins.*
The Upjohn Polymer Chemical Technical Bulletin, *PAPI* ® 94.
The Upjohn Polymer Chemical Technical Bulletin, *PAPI* ® 20, *Adhesive Materials*, p. 256.
Exxon Chemicals Technical Bulletin, Vistalon ® Ethylene-Propylene Terpolymers.
Exxon Chemicals Technical Bulletin, Vistanex ® Polyisobutylene.
Exxon Chemicals Technical Bulletin, Exxon Butyl Rubber.
Exxon Chemicals Technical Bulletin.
Vistalon ® Ethylene-Propylene Copolymers.
A technical bulletin, *Elvax* ® *Resin Grades*.
Exxon Chemicals Technical Bulltein, Escorez ® 2392 Petroleum Hydrocarbon Resin.
Exxon Chemicals Technical Bulletin, Escorez ® 1310 LC petroleum.
Exxon Chemicals Technical Bulletin, Escorez ® 5300 Series Resins.
Hercules Product Data Bulletin, *Kristalex* ® 3070, 3085, and 3100.

*Primary Examiner*—John J. Gallagher
*Attorney, Agent, or Firm*—Merchant, Gould, Smith, Edell, Welter & Schmidt

[57] ABSTRACT

Reactive hot melt adhesive compositions combining the characteristics of hot melt adhesives and curing urethane adhesive can be prepared by blending an ethylene-vinyl monomer thermoplastic polymer having sufficient structural integrity to provide cohesive strength with a urethane prepolymer and a tackifying agent. The composition has sufficient green strength to form initial bonds. Additionally, over time, the composition cures to a final rigid, resilient quality structural adhesive bond.

13 Claims, No Drawings

THERMALLY STABLE REACTIVE HOT MELT URETHANE ADHESIVE COMPOSITION HAVING A THERMOPLASTIC POLYMER, A COMPATIBLE, CURING URETHANE POLYESTER POLYOL PREPOLYMER AND A TACKIFYING AGENT

FIELD OF THE INVENTION

The invention relates to an extrudable reactive hot melt urethane adhesive containing a urethane prepolymer, a tackifying resin and a thermoplastic resin. The solvent-free compositions of this invention can be extruded at elevated temperatures to form strong green bonds, in other words, when the bond line is cooled the composition initially forms bonds of adequate strength. The high quality green bond can maintain the structural integrity of the joined work pieces until the green bond line cures to a hard, resilient, strong cohesively bonded structurally sound mass.

BACKGROUND OF THE INVENTION

Generically, both hot melt adhesives and moisture cure urethane adhesives are well known generic adhesive classes. Hot melt adhesives can be conveniently applied by extruding the adhesive composition at elevated temperatures directly onto a work piece for the purpose of forming a structural bond with another work piece as the temperature of the adhesive compositional mass cools. While hot melt adhesives have many adhesive preparation and workpiece production benefits, hot melt adhesives have the drawback that after cooling to form a bond line, the thermoplastic compositions can be temperature sensitive. In other words, the bonding mass can lose bond strength as the temperature of the work piece and the bond line increase. Further, hot melt adhesives tend to be physically unstable in the presence of hydrocarbon solvents and some other organic compositions.

In sharp contrast, curable urethane adhesives have little green strength. After application of a urethane adhesive, the joined workpieces can require external mechanical support until the urethane adhesive can cure to a strong resilient highly crosslinked bondline. Cured polyurethane bonds have high tensile strength and have little or no temperature sensitivity. Cured urethanes can remain strong as temperatures rise until decomposition occurs, typically at very high temperatures. Such adhesives have value where initial green strength is not important since substantial bond formation requires a period of curing time which can range from a number of hours to a number of days.

Clearly an adhesive displaying both curing and hot melt properties in a single adhesive composition is a desirable goal since the resulting adhesive in theory could possess quick high strength green bond and strong crosslinked cured adhesive bonding.

One suggested adhesive is Uchigaki et al, U.S. Pat. No. 3,931,077, which discloses reactive high viscosity hot melt adhesive compositions comprising a specific high viscosity reactive urethane prepolymer, a specific ethylene-vinyl acetate thermoplastic polymer and a phenolic or abietic acid type tackifying resin. Uchigaki teaches that hot melt moisture cure thermosetting adhesives should have a liquid urethane prepolymer having a viscosity higher than 300,000 cP at 25° C. Uchigaki suggests that substantially lower viscosities result in adhesive compositions haing a suitable viscosity for application but having inferior instant or green strength. Further, Uchigaki suggests using thermoplastic polymer compositions in the adhesive compositions such as an ethylene-vinyl acetate copolymer wherein the polymer contains ethylene in the range of about 90 to 70 wt-%. Further, Uchigaki suggests that concentrations of less than 70 wt-% ethylene results in adhesives having poor final adhesive strength. Further, Uchigaki teaches that tackifier components that can be used in the hot melt thermosetting adhesives should be a terpene phenol copolymer or an abietic acid type resin whose active hydrogens and double bonds are at least partly removed by esterification and/or hydrogenation. Such compositions include tackifier resins such as hydrogenated rosin, a hydrogenated rosin glycerine ester, a hydrogenated rosin pentaerythritol ester, disproportionated rosin, polymerized rosin, etc. Uchigaki further teaches that other types of tackifiers that are reactive with isocyanate groups on a prepolymer composition are undesirable. Further, Uchigaki suggests that some other types of tackifiers are insufficiently miscible with the adhesive components to result in a stable blend.

A further type of hot melt adhesive is disclosed in Reischle et al, U.S. Pat. No. 4,585,919 which teaches the combination of an isocyanate prepolymer, a thermoplastic polyurethane or polyester, and a synthetic resin selected from the group consisting of ketone resins, hydrogenation products of acetophenone condensation resins, and mixtures thereof.

In formulating reactive hot melt adhesive compositions, we have found substantial difficulty in obtaining compatible low viscosity adhesive systems that remain in a single phase when held at hot melt application temperatures. Many proposed adhesive formulations are not miscible and cannot be mixed under ordinary production conditions to form a stable adhesive mass. Further, even if miscible in production conditions involving severe mixing conditions, the compositions can phase and separate when held at the point of use in hot melt extrusion equipment. Further, certain apparently phase stable compositions can have poor machining characteristics. Accordingly, obtaining a compatible blend is critical.

We have also found that reactive urethane compositions maintained at elevated temperature in typical hot melt equipment can have a tendency to increase in viscosity over time. Such viscosity increase can substantially interfere in the efficient application of the hot melt adhesive compositions to the work piece. Accordingly, a substantial need exists in finding hot melt adhesives having extended pot life, in other words controllable viscosity at elevated temperature.

BRIEF DESCRIPTION OF THE INVENTION

We have found compatible blends of components that form hot melt curing urethane adhesives with heat stability, green bond strength and fully cured bond strength that are surprisingly compatible in production and use. The reactive hot melt adhesive composition of this invention comprises a urethane prepolymer composition which is a reaction product between a polyester polyol and isocyanate composition, an effective amount of a tackifier resin, and an effective amount of an ethylene-vinyl monomer thermoplastic copolymer resin having a melt index of about 0.2 to 1000 and a vinyl monomer content of about 1–60 wt-%, preferably 18–50 wt-%. The novel components of the adhesive composition cooperate to form a melt compatible adhesive composition that has substantial initial green strength, substantial cured bond strength, chemical and heat resistance when cured and extended pot life.

DETAILED DESCRIPTION OF THE INVENTION

We have found that the hot melt moisture cure adhesive compositions of the invention comprise a polymer of reduced polarity including a polymeric ethylene-vinyl monomer resin having a vinyl monomer content of about 1-60 mole-% in combination with a compatible tackifying resin and a urethane prepolymer comprising the reaction product of a polyester polyol, which is the reaction product of a polyfunctional carboxylic acid compound and a polyfunctional hydroxy compound, and an isocyanate compound.

Prepolymers

Prepolymers useful in manufacturing the reactive hot melt adhesives of this invention comprise an isocyanate capped polyester prepolymer composition made by reacting an isocyanate compound with a polyester polyol.

The term "isocyanate compound" in the context of this invention indicates a typically monomeric small molecule having 2 or more —NCO groups. Isocyanate compounds useful for forming the prepolymer compositions of the invention include organic, aliphatic and aromatic isocyanate compounds having an isocyanate functionality of about 2 or more. The isocyanate compound of the invention can have from 1 to 10 aliphatic or aromatic groups substituted by the isocyanate group. The isocyanate compounds can also contain other substituents which do not substantially adversely affect the viscosity of the isocyanate terminated prepolymers, the adhesive properties of the bond line or the reactivity of the —NCO groups during the formation of the prepolymer. The isocyanate compound can also comprise mixtures of both aromatic and aliphatic isocyanates and isocyanate compounds having both aliphatic and aromatic character.

Typical aromatic isocyanate compounds include diphenylmethane diisocyanate compounds (MDI) including its isomers, carbodiimide modified MDI, diphenylmethane-4,4'-diisocyanate, diphenylmethane-2,2'-diisocyanate, diphenyl-methane-2,4'-diisocyanate, oligomeric phenyl methylene isocyanates; toluene diisocyanate compounds (TDI) including isomers thereof, tetramethylxylene diisocyanate (TMXDI), isomers of naphthylene diisocyanate, isomers of triphenylmethane triisocyanate, and mixtures thereof. Aliphatic di, tri, and polyisocyanates are also useful including for example isophorone diisocyanate, hydrogenated aromatic diisocyanates, aliphatic polyisocyanates, cycloaliphatic polyisocyanates, and others.

Polyester

Suitable polyols that can be used in the polyester prepolymer have a molecular weight in excess of 250, more typically in excess of 500, most preferably in the molecular weight range of about 500-10,000. Typical polyols comprise monomeric diols, triols, etc. and polymeric diols, triols comprising a chain of repeating alkylene units providing a major contribution to the molecular weight of the material. A typical polymeric polyol consists essentially of either a linear or branched chain of the repeating units which is terminated with hydroxyl groups and for the sake of simplicity these hydroxyl groups will normally be the active hydrogen containing substituents in the polyol structure reacting with the capping isocyanate compounds.

Preferred polyols for use in the polyester prepolymers of the invention include monomeric polyols having 2, 3, 4, or more hydroxyl groups. Representative examples include ethylene glycol, propylene glycol, glycerine, trimethylol propane, 1,2,6-hexane triol, butene diol, sucrose, glucose, sorbitol, pentaerythritol, mannitol, triethanolamine, n-methyl dimethanolamine, and cyclic aromatic and aliphatic di and triols.

Especially preferred polyols for use in the invention are hexane diol, higher polyalkylene diols, cyclic polyols containing 1 to 3 —OH groups and a cycloaliphatic structure. Examples of such preferred diols include 1,4-dihydroxymethyl cyclohexane, hydrogenated bisphenol-A, hexane diol, dodecane diol, or other higher molecular weight diols. Under certain conditions release of vaporized isocyanate compositions can occur during manufacture or application of the adhesive of the invention. In order to reduce isocyanate volatility, a small amount of a low moleoular weight polyol can be added, with the prepolymer polyol, that can react with free isocyanate compounds.

The polyester prepolymer polyols of this invention can be produced by reacting the above discussed polyols with a polyfunctional carboxylic acid compound, preferably a higher ($C_6$, $C_8$ or higher) paraffinic diacid. Such polyfunctional acids are primarily monomeric compositions having two or more carboxylic acid groups. Representative examples of such acids include 1,6-hexane-dioic acid, dodecane dioic acid, azelaic acid, sebacic acid, 1,18-octadecane dioic acid, phthalic acid, phthalic anhydride, succinic acid, higher alkyl or alkenyl substituted succinic anhydrides such as dodecenyl succinic anhydride, octadecyl succinic anhydride and others, maleic acid, fumaric acid, dimer acid prepared from a mono-, di- or triunsaturated fatty acid, acid wax, acid anhydride grafted wax, or other suitable polycarboxylic acid reacting compound.

A preferred polyester prepolymer for use in this invention comprises the reaction product of dimer acid and either a 1,4-dihydroxyalkyl cyclohexane or hydrogenated bisphenol-A, dimer acid being a composition made by reacting active olefinic groups in a $C_{12-24}$ unsaturated fatty acid resulting in crosslinking between two fatty acid molecules.

The preferred polyester polyols that are used in the polyurethane prepolymers of the invention are tailored in polarity to the polarity of the ethylene vinyl acetate copolymer used in the adhesive. The polarity of the polyester can be estimated using the average equivalent weight of the polyol and the average equivalent weight of the polyacid. For ethylene vinyl acetate copolymers having 50 wt-% vinyl acetate or more, the sum of the average equivalent weight of the polyol and the polyacid should be about 150 to 500. For an ethylene vinyl acetate having a vinyl acetate content of about 28 to 50 wt-%, the sum of the average equivalent weight of the polyol glycol and the poly acid should be between 150 and 600 or preferably 200 to 500. For an ethylene vinyl acetate having a vinyl acetate content of 28 wt-% or less the sum of the average equivalent weight of the polyol glycol and the poly acid should be between 250 and 300, and preferably between 300 and 1500.

The molecular weight of the polyester polyol is important in the polarity of the final prepolymer composition. Selecting polyester polyols with lower molecular weights and preparing the prepolymers of the invention results in increasing polarity as the molecular weight of the polyol decreases. As the molecular weight of the polyol increases the polarity of the resulting prepolymer is reduced. The adhesive compatibility can be enhanced by selecting the polarity of the prepolymer composition to match the polarity of the thermoplastic ethylene vinyl acetate polymer.

In the reactive hot melt of this invention the isocyanate compound reacts with the terminal hydroxyl group to form isocyanate terminated prepolymer compositions having free NCO groups for reaction with moisture or other reactive hydrogen containing compounds.

Thermoplastic Polymer Component

The reactive hot melt urethane adhesive composition of the invention contains a compatible thermoplastic vinyl polymer which cooperates with the other adhesive components to provide initial green strength and cured strength to the inventive compositions. Preferably, the thermoplastic polymer composition is matched in polarity with the urethane-prepolymer polyester polyol composition and with the tackifier. The preferred thermoplastic copolymer component of this invention comprises an ethylene vinyl monomer polymer such as an ethylene vinyl acetate copolymer or an ethylene acrylic monomer copolymer.

The polyethylene-vinyl monomer composition can be a film-forming thermoplastic polymer compatible with the adhesive components of the invention. Preferably the vinyl monomer of the ethylene vinyl monomer composition comprises an acrylate monomer or a vinyl ester monomer of a carboxylic acid compound. Acrylate monomers that can be used in the film-forming polymer of the invention include acrylic acid, methacrylic acid, acrylamide, methacrylamide, methylacrylate, ethyl acrylate, methylmethacrylate, 2-ethylhexylacrylate, 2-ethylhexylmethacrylate, methoxyethylmethacrylate, methoxyethylacrylate, and others. Acrylate monomers are well known in the art and are selected for copolymerization with ethylene based on the polarity of the monomer. Vinyl esters of carboxylic acids include such monomers as vinyl acetate, vinyl butyrate, and others.

The preferred isocyanate capped prepolymers of this invention are formulated to have a polarity compatible with ethylene-vinyl acetate polymers (EVA) having about 10-60 wt-% vinyl acetate and a melt index of about 0.2 to 1000. The most preferred EVA comprises a copolymer with about 18 to 50 wt-% vinyl acetate and a melt index of about 0.2 to 500. The compositions of polymers using other second monomer systems should be formulated to obtain a polarity approximating the polarity of these EVA compositions.

Tackifying Resin

The adhesives of the invention contain a tackifying resin in combination with the thermoplastic polymer and the reactive urethane prepolymer. The tackifying resins useful in adhesives of the invention comprise aromatic, aliphatic or aliphatic aromatic tackifying resins.

Aromatic resins useful in forming the adhesive compositions of this invention can be prepared from any monomer containing an aromatic moiety and a polymerizable ethylenically unsaturated group. Typical examples of aromatic monomers include styrenic monomers such as styrene, alpha-methyl styrene, vinyl toluene, methoxy styrene, tertiary butyl styrene, chlorostyrene, etc., indene monomers including indene, methylindene and others. Aliphatic aromatic tackifying resins can be made by polymerizing feed streams containing a mixture of one or more aliphatic monomers in combination with one or more aromatic monomers. Typically aromatic aliphatic resins can be formed from the aromatic monomers above in mixture with generally unsaturated petroleum feedstocks which contain $C_{4+}$ monomers.

The mixed aromatic-aliphatic resins contain aromatic monomers recited above polymerized with aliphatic monomers, preferably with the $C_{4-6}$ monomers recited below.

Both natural and synthetic terpene tackifying resins and synthetic aliphatic hydrocarbon resins can be used in the compositions of the invention as tackifying agents.

Typical monomers making up aliphatic hydrocarbon resins include 1,3-butadiene, cis-1,3-pentadiene, trans-1,3-pentadiene, 2-methyl-1,3-butadiene, 2-methyl-2-butene, cyclopentadiene, dicyclopentadiene, and others.

The preferred tackifying resin used depends upon the wt-% VA content of the EVA. For EVA resins having a wt-% of VA greater than 28-33%, aromatic or aliphatic-aromatic resins having a ring and ball softening point of 70°-120° C. are preferred. For EVA resins having a wt-% of VA less than 28% aliphatic or aliphatic-aromatic resins having a ring and ball softening point of 70°-120° C. are preferred.

The compositions of the invention can contain other compatible polymers, fillers, pigments, dyes, catalysts, inhibitors, antioxidants, UV absorbers, waxes and other conventional additives. The fillers may be in the form of particles or fibers of compositions including ceramics, glass, silica, quartz, mica, treated clay, titanium dioxide, boron nitrides, graphite, carbon black, glass fibers, asbestos fibers, metal powders, etc., the amount of filler depending on particular properties of the composite desired.

In somewhat greater detail, the reactive hot melt urethane adhesives of this invention typically comprise an effective bonding amount of a thermoplastic polymer base to provide initial green strength, an effective amount of a polyurethane prepolymer composition comprising the reaction product of (i) a polyester polyol, and (ii) and an isocyanate composition to provide final cured strength, chemical and heat resistance; and a compatible tackifying resin. The reactive hot melt urethane adhesive composition is typically blended in melt under anhydrous inert gas mixing conditions to form a uniform adhesive admixture which is then typically packaged in a variety of sizes ranging from about 25 g. to 250 kilogram mixtures. In use the compositions are placed in hot melt application equipment under an inert gas blanket, heated to melt temperature for extrusion.

The reactive hot melt urethane adhesive compositions of the invention can be cured in the bond line using a variety of mechanisms. The curing reaction occurs between a compound having an available active hydrogen atom and the NCO groups of the polyurethane prepolymer. A variety of reactive compounds having free active hydrogens are known in the art including water, hydrogen sulfide, polyols, ammonia, and other active compounds. Such curing reactions can be conducted by relying on the presence in the atmosphere such as moisture, of the active compounds or the active compounds can be added to the adhesive at the bond line.

Typically the adhesive compositions of this invention can be prepared using the proportions found in the following Table.

TABLE 2

|  | Typical Adhesive Parts by Weight | Preferred Adhesive Parts by Weight | Most Preferred Adhesive Parts by Weight |
| --- | --- | --- | --- |
| Thermoplastic Polymer | 1–200 | 20–175 | 20–150 |
| Prepolymer | 100 | 100 | 100 |
| Tackifying Resin | 1–200 | 20–200 | 40–135 |

While the choice of component, order of addition, and addition rate can be left to the skilled adhesives chemist, generally the reactive hot melt urethane adhesives of this invention can be made by preparing the isocyanate capped prepolymer and blending the prepolymer with the base thermoplastic polymer base and the tackifying agent and other optional ingredients if necessary. The prepolymer phase is typically prepared by reacting the isocyanate compound with the polyester polyol compound at elevated reaction temperatures, typically in the range of 100°–400° F. (38°–205° C.). Commonly the polyisocyanate compound is introduced into a suitable reaction vessel, heated to reaction temperature, and into the heated isocyanate compound is placed the polyester polyol for reaction. Moisture is typically excluded from reaction using dry chemicals and conducting the reaction under vacuum or the presence of an anhydrous gas blanket. The polyester polyol compound is reacted with the isocyanate compound in the reactive vessel at ratios that typically depend on the hydroxy and isocyanate functionality of the reactants. Typically the compounds are reacted at ratios which result a reaction between isocyanate groups and hydroxy groups leaving essentially no residual hydroxy and minimal isocyanate functionality, typically less than 10 wt-%. Typically the reaction between the polyester polyol compound and the isocyanate compound is conducted at an OH:NCO ratio of about 0.75 to 0.16:1 in order to obtain an NCO concentration in the final adhesive of about 1 to 5%. Typically the prepolymer is titrated to measure residual concentration of isocyanate using ASTM D-2572-80 "Standard method for isocyanate group and urethane materials or prepolymers". If the prepolymer composition has acceptable viscosity and isocyanate content, it can be packaged in suitable moisture resistant containers or immediately blended with the balance of the components to form the finished adhesive of the invention.

The adhesives of the invention can be formed into a single package combining the prepolymer, the vinyl polymer base and the tackifying agent. Typically the combination can be made with standard batch or continuous industrial reaction or blending equipment having suitable agitation, temperature control, vacuum and inert atmosphere. Again, in the formation of the finished adhesive composition, blending of the individual components can be left to the skilled adhesives formulator, however we have found that the blending of the composition at elevated temperature is preferably conducted by adding to acceptable blending equipment, the tackifying resin which is melted at an elevated temperature sufficient to melt the composition but to maintain the chemical integrity of the additional components including the isocyanate prepolymer. The melt tackifying resin agitated and into the melt resin is added the thermoplastic polymer. The components are mixed at a rate such that the ingredients are smoothly combined. The prepolymer is added to the melt to form a compatible single phase adhesive composition and is typically deaerated.

The following specific Examples, which contain a best mode, can be used to further illustrate the invention.

EXAMPLE I

Into a glass reaction vessel equipped with a stirrer, a nitrogen inlet tube, a condenser, and a thermometer was placed 4.76 equivalents (22.85 parts) of 90% 1,4-dimethylol cyclohexane in water with 4.05 equivalents (77.15 parts) of dimer acid (EMPOL 1014, Emery Chemicals). The contents of the reactor were stirred and heated to a temperature of about 450° F. During the reaction water of esterification was continually generated until the reaction was complete. A vacuum was pulled on the sample. The polyester polyol was then cooled, it had an acid number of 4 and a hydroxyl equivalent weight of about 2000 grams per equivalent.

The polyester polyol was cooled to 158° F., 1180.51 grams remained in the reaction vessel.

295.13 grams of MDI (Isonate 125M) was melted and added to the reaction vessel with vigorous stirring. The reaction temperature was kept at 167°–183° F. for 160 minutes, then the vessel was cooled.

EXAMPLE II

Into a glass reaction vessel equipped with a stirrer, a nitrogen inlet tube, a condenser, and a thermometer was placed 3.05 equivalents (64.1 parts) of dodecanedioic acid with 3.32 equivalents (35.9 parts) of 1,6-hexane diol. The vessel was heated to melt the contents of the reactor. Stirring began and the vessel was heated to a temperature of about 450° F. During the reaction water of esterification was continually generated until the reaction was complete. A vacuum was pulled on the sample. The polyester polyol was then cooled, it had an acid number of 7 and a hydroxyl number of 25.

The polyester polyol was cooled to 212° F., 334 grams remained in the reaction vessel.

85 grams of MDI (Isonate 125M) was melted and added to the reaction vessel with vigorous stirring. The resulting prepolymer formed a crystalline solid upon cooling from the melt.

EXAMPLE III

Into a glass reaction vessel equipped with a stirrer, a nitrogen inlet tube, a condenser, and a thermometer was placed 7.34 equivalents (56.25 parts) of dodecanedioic acid with 8.2 equivalents (43.75 parts) of 90% 1,4-dimethylol cyclohexane in water. The contents of the reactor were stirred and heated to a temperature of about 450° F. During the reaction water of esterification was continually generated until the reaction was complete. A vacuum was pulled on the sample for three hours. The polyester polyol was cooled, it had an acid number of 7 and a hydroxyl number of 36.5.

The polyester polyol was cooled to 237° F., 1283.08 grams remained in the reaction vessel.

387 grams of Carbodiimide modified MDI (Isonate 143L) was added to the reaction vessel with vigorous stirring. The resulting prepolymer formed a crystalline solid upon cooling from the melt.

EXAMPLE IV

Into a heated, double arm sigma blade mixer equipped with a vacuum source, inert gas source and thermometer was placed 40 parts of a styrenated terpene tackifying resin (ZONATAC 105 LITE). The tackifying resin was covered with inert gas and heated until melted and into the melt was placed, under agitation, 30 parts of an ethylene-vinyl acetate copolymer having a melt index of 5.3–6.7 and 27.2–28.8 wt-% vinyl acetate (ELVAX 260). The contents of the reactor were mixed under vacuum until uniform and into the uniform blend was placed 30 parts of the prepolymer of Example I. The initial viscosity of the material was 37,200 cPs at 350° F. After 2 hours the viscosity was 47,000 cPs which remained constant over 12 hours. The adhesive had surface tack and cured to a resilient, tough cohesively bonded mass in 11 days.

EXAMPLE V

Into a heated double arm sigma blade mixer equipped with a vacuum source and an inert gas source was placed 30 parts of an ethylene-vinyl acetate copolymer having a melt index of 18 and 51 wt-% vinyl acetate (VYNATHENE EY 905) with 25 parts of an aromatic alphamethyl styrene tackifying resin having a ring and ball softening point of 97° to 103° C. (KRISTALEX 3100). The mixer was operated under vacuum until smooth. When smooth the vacuum was removed with inert gas and 45 parts of the prepolymer of Example II was added to the heated mixer. The vacuum was restored and the mixer was operated until smooth over approximately a 30-minute period.

| | |
|---|---|
| Green Strength G* (dynes/cm$^2$) 25° C. | 2.147 E7 |
| Green Strength G* (dynes/cm$^2$) 40° C. | 1.315 E7 |
| 200 g Peel | 244 ± 20° F. |
| Ultimate Tensile | 1313 psi |
| % Elongation | 1231 |
| Initial viscosity, 300° F. | 36,200 |
| 4-hour viscosity, 300° F. | 47,300 |

EXAMPLE VI

Into a heated double arm sigma blade mixer equipped with a vacuum source and an inert gas source was placed 30 parts of an ethylene-vinyl acetate copolymer having a melt index of 18 and 51 wt-% vinyl acetate (VYNATHENE EY 905) with 25 parts of an aromatic alphamethyl styrene tackifying resin having a ring and ball softening point of 97° to 103° C. (KRISTALEX 3100). The mixer was operated under vacuum until smooth. When smooth the vacuum was removed with inert gas and 45 parts of the prepolymer of Example III was added to the heated mixer. The vacuum was restored and the mixer was operated until smooth over approximately a 30-minute period.

| | |
|---|---|
| Green Strength G* (dynes/cm$^2$) 25° C. | 1.160 E6 |
| Green Strength G* (dynes/cm$^2$) 40° C. | 4.282 E5 |
| 200 g Peel | 170 ± 8° F. |
| Ultimate Tensile | 1227 psi |
| % Elongation | 739 |
| Initial viscosity, 300° F. | 67,000 |
| 4-hour viscosity, 300° F. | 55,250 |

EXAMPLE VII

Into a heated, double arm sigma blade mixer equipped with a vacuum source, inert gas source and thermometer was placed 600 grams of a 195° F. softening point wax. The wax was heated under an inert gas blanket to a temperature of 300° F. until molten and into the molten wax was placed a mixture of 640 grams of a first tackifying resin and 560 grams of a second tackifying resin (ESCOREZ 7312 and ESCOREZ 2393, respectively). The mixer was operated until the wax resin blend was molten and uniform and into the melt was placed 720 grams of an ethylene vinyl acetate copolymer having 28 wt-% vinyl acetate and a melt index of 3 (ELVAX 265). The contents of the mixer were mixed under vacuum until uniform and into the mix was placed 1480 grams of the urethane prepolymer of Example I. The composition was used to manufacture paper bound books yielding excellent page pull and page flex properties.

EXAMPLES VIII–XIII

Examples IX–XIV in the following Table were manufactured using the same procedure as Example IV.

TABLE 3

| | VIII | IX | X | XI | XII | XIII |
|---|---|---|---|---|---|---|
| | | Examples IX–XIV | | | | |
| Styrene-terpene tackifier | 28.8 | 10.0 | 46.0 | 30.0 | 47.5 | 23.1 |
| Ethylene-vinyl acetate 28% VA, MI = 400 | 28.7 | 65.0 | 20.0 | 10.0 | 10.0 | 23.1 |
| Prepolymer of Ex. I | 42.5 | 25.0 | 34.0 | 60.0 | 42.5 | 53.8 |
| Green Strength | | | | | | |
| G* dyne/cm$^2$ 25° C. | 6.695E5 | 4.435E6 | 9.102E5 | 2.443E5 | 3.432E5 | 3.385E5 |
| G* dyne/cm$^2$ 40° C. | 1.892E5 | 1.775E6 | 1.827E5 | 4.372E4 | 4.946E4 | 1,041E5 |
| 200 g Peel °F. | >350 | 116 ± 3 | 336 ± 12 | >350 | >350 | >350 |
| % NCO zero pt. | 2.12 | 1.20 | 1.68 | 2.99 | 2.16 | 2.68 |
| % NCO 24 hrs. | 1.52 | 0.783 | 1.07 | 1.91 | 1.70 | 2.18 |
| % cure 24 hrs. | 28.30 | 34.75 | 36.31 | 36.12 | 21.30 | 18.66 |
| 1 week Ultimate Tensile PSI | 439.691 ± 18.98 | 272.787 ± 16.267 | 503.86 ± 30.65 | 553.74 ± 44.88 | 866.339 ± 54.04 | 437.038 ± 80.811 |
| 1 week % Elongation | 547.5 ± 43.0 | 636.9 ± 54.7 | 926.2 ± 83.3 | 513.0 ± 66.9 | 631.9 ± 63.2 | 508.1 ± 95.9 |
| Initial Viscosity 300° F. | 3,875 | 19,050 | 2,710 | 1,295 | 1,350 | 3,850 |

TABLE 3-continued

| | | Examples IX–XIV | | | | |
|---|---|---|---|---|---|---|
| | VIII | IX | X | XI | XII | XIII |
| 4 Hour Viscosity 300° F. | 4,775 | 22,750 | 3,170 | 1,635 | 1,410 | 4,125 |
| % Increase | 23.23 | 19.42 | 16.97 | 26.26 | 4.44 | 7.14 |

[1]E = exponent of 10.

The Examples and data shown above indicate that the compositions of the invention can be blended into reactive hot melt urethane adhesives having both hot melt and curing adhesive properties. The adhesives can be blended to have cured bonds with superior heat resistance with low initial uncured adhesive viscosity. Further, the cured adhesives can have ultimate tensile strengths in the range of about 280 to 2,000. Such data indicates that the blended components cooperate to provide the combined properties of a hot melt adhesive and achieved curing urethane adhesive properties. Further, the adhesives can be blended to have superior heat resistance while having low initial viscosity.

The data shown above were developed using the following procedures.

200 Gram Peel Test

Scope:

Kraft paper is laminated to form a one inch by one inch bond area. Weights are attached in the peel mode and the samples are placed in an oven. The oven is programmed to increase at a certain rate of temperature. The temperature at which the bond delaminates is recorded.

Equipment:
1. Programmable oven capable of a 25° C. per hour increase from 25° C. to 150° C.
2. 40 pound basis weight kraft paper.
3. 200 gram weights.
4. Device for monitoring oven temperatures.
5. Device for supporting samples in the oven.
6. Release paper.
7. Two glass rods, each one-half inch in diameter and eight inches long. One glass rod should have a ten mil shim at each end.

Sample Preparation
1. Cut two sheets of kraft paper, each six inches by twelve inches.
2. Cut two pieces of release paper, each two inches by twelve inches.
3. Tape one piece of kraft paper to a heat insulator such as a tablet back, heavy chip board, etc.
4. Tape the two pieces of release paper to the kraft lengthwise in the center, exactly one inch apart.
5. Lay the second piece of kraft paper on top of the release paper so it entirely covers the first piece of kraft paper. Tape one end only of the second piece of kraft to the composite.
6. Fold back the second piece of kraft and place the shimmed glass rod on the tape "hinge".
7. Place the unshimmed glass rod below the second sheet of kraft paper as close to the tape "hinge" as possible. (The second piece of kraft is now between the two glass rods. The shimmed rod is on top in view. The unshimmed rod is partially concealed by the second piece of kraft because it is folded back.)
8. Pour a stream of hot melt at its normal application temperature, (e.g., 350° F.) onto the first piece of kraft between the release paper.
9. Quickly push both glass rods across the bottom sheet of kraft paper. (The shimmed glass rod will draw the hot melt into a film, and the second rod will pull the second piece of kraft paper over the first to form a bond.)
10. Trim the "sandwich" widthwise to four inches and lengthwise to six inches.
11. Cut the "sandwich" widthwise into six pieces, each one inch by four inches.
12. Allow bonds to fully cure in a room at 50% RH, 25° C.

Procedure:
1. Suspend the six samples, frm one "tail" in the oven.
2. Attach a 200 gram weight to a tail of each sample in the peel mode.
3. Start the oven at 25° C. and increase the temperature continuously at 25° C./hour.
4. Observe the samples and note the temperature at which the samples delaminate and the weight falls.

Report:

Report the average temperature at which the samples fail.

Tensile/Elongation Test

Scope:

This test procedure describes the method whereby the tensile characteristics can be determined at a constant strain rate.

Equipment:
1. Instron tensile tester or equivalent.
2. Teflon drawdown sheet.
3. ASTM D-412 Type C die.
4. Micrometer.

Sample Preparation:
1. Prepare a 20-30 mil adhesive film. The film must be void free.
2. Allow the film to cure in a room at 50% RH, 25° C.
3. Cut at least five samples from the film with the ASTM D-412 Type C die.
4. Measure the film thickness of each sample at the gauge section in the middle and record. If properly cut, the sample should have a gauge section width of 0.25 inches, but check to be sure.
5. Condition the samples for at least 18 hours at 25° C., 50% relative humidity.

Test Procedure:
1. Set the tensile tester jaws to a 2" gap, and attach the sample.
2. Elongate at the constant strain rate of 10" per minute until the sample breaks, while recording the stress versus strain.
3. Repeat steps 1 and 2 with the remaining samples.

Calculations:
1. Tensile stress - calculate the tensile by dividing the force by the cross-sectional area of the sample.
2. Strain elongation calculate the elongation by dividing the sample length or tensile tester jaw gap at the point in question by the initial sample gap and multiply by 100%.

Report:
1. Elongation at break as the average of at least 5 samples.
2. Ultimate tensile and elongation at the highest point of stress as the average of at least 5 samples.
3. Tensile and elongation at the yield point as the average of at least 5 samples.

Initial Green Strength Test

Scope:
This method describes the procedure for quantifying initial green strength using the Rheometrics Dynamic Spectrometer.

Summary of Method:
The complex modulus of a sample of adhesive is measured at a given frequency and at two different temperatures.

Equipment:
1. Rheometrics Dynamic Spectrometer with nitrogen controller, mid-range transducer.
2. 12.5 mm parallel plate fixture.
3. Adhesive sample (uncured) 10–20 g.

Procedure:
1. Place sample between plates and increase the chamber temperature to a point where the material will flow under compression. Adjust the sample thickness (gap) to 1.5 to 2.5 mm.
2. Set frequency at 1.0 radians/second.
3. Set strain at 1%.
4. Condition sample at 25° C.
5. Run single measurement at least five times.
6. Adjust temperature to 40° C. and repeat step 5. Adjust strain if necessary.

Report:
1. Report average complex modulus (G*) for five measurements at two temperatures.
2. Report temperature and percent strain for each measurement.

Cure Rate of Urethane Adhesive by NCO Determination

Scope:
This method describes the procedure for determining the cure rate by NCO determination.

Equipment:
1. See standard procedure for % NCO determination of urethanes with low isocyanate.
2. Glass rod for making 20 to 30 mil hot melt films.
3. Teflon sheet approximately 12"×24".
4. Constant temperature/humidity environment.
5. Molten adhesive sample.

Procedure:
1. Determine the quantity of sample required by estimating the number of days to a full cure.
2. Draw down 20–30 mil films on a clean teflon sheet.
3. Run NCO determination on an initial, zero time sample.
4. Place teflon sheets and adhesive in a constant temperature (25° C.) and constant humidity (50% RH) environment.
5. Remove enough sample to run NCO determination every hours until % NCO<0.1%.

Report:
1. % NCO every 24 hours.
2. Temperature and humidity readings.
3. Report time under cure conditions (days, % RH).
Supplement:

Viscosity Stability Test

Scope:
This method describes the procedure for measuring thermal stability by tracking viscosity versus time using a Brookfield Thermosel Viscometer.

Equipment:
1. Brookfield Thermosel Viscometer with a chart recorder.
2. Adhesive sample (8–13 g.).

Procedure:
1. Weight out the appropriate amount of sample (8 grams for spindle 21; 10.5 grams for spindle 28; 13 grams for spindle 29) and place it in the thermosel chamber.
2. Set temperature at 300° F. and note the time.
3. Run a continuous viscosity for eight hours or until sample gels. Run chart recorder to track viscosity over time.

Report:
1. Initial and final viscosity (include time elapsed).
2. Spindle and speed used.
3. Percent increase or decrease per hour.
4. Graph of viscosity versus time over time period measured.

The discussion, Examples and data found above provide a thorough understanding of the invention. However, since many embodiments of the invention can be made without departing from the spirit and scope of the invention, the invention resides in the claims hereinafter appended.

We claim:

1. A reactive hot melt urethane adhesive composition having extended pot stability, bond heat stability, green strength and cured bond strength which comprises:
   (a) a urethane prepolymer composition comprising the reaction product of an isocyanate compound and a polyester-polyol prepared by reacting a polyfunctional carboxylic acid compound and an aliphatic or cycloaliphatic diol or triol compound;
   (b) about 1 to 200 parts by weight per each one hundred parts of the prepolymer of a structural thermoplastic ethylene vinyl monomer copolymer composition having a melt index of about 0.2 to 1000 and a vinyl monomer content of about 10 to 60 wt-%; and
   (c) about 1 to 200 parts by weight per each one hundred parts by weight of the prepolymer of a compatible aliphatic, aromatic or aliphatic-aromatic tackifying resin.

2. The adhesive of claim 1 wherein the vinyl monomer content comprises 18–50 wt-%.

3. The adhesive of claim 1 wherein the polyol of the polyester-polyol comprises a cycloaliphatic diol.

4. The adhesive of claim 3 wherein the cycloaliphatic diol comprises a dihydroxyalkyl cyclohexane.

5. The adhesive of claim 4 wherein the dihydroxyalkyl cyclohexane comprises a 1,4-dihydroxymethylcyclohexane.

6. The adhesive of claim 3 wherein the aliphatic diol comprises a 1,6-hexane diol.

7. The adhesive of claim 1 wherein the polyfunctional carboxylic acid compound comprises an aliphatic dicarboxylic acid compound.

8. The adhesive of claim 7 wherein the aliphatic dicarboxylic acid compound comprises a dimer fatty acid.

9. The adhesive of claim 1 wherein the ethylene vinyl monomer composition comprises an ethylene vinyl acetate copolymer.

10. The adhesive of claim 9 wherein the ethylene vinyl acetate copolymer comprises 14 to 33 wt-% vinyl acetate and the tackifying resin comprises an aliphatic or aliphatic-aromatic resin.

11. The adhesive of claim 9 wherein the ethylene vinyl acetate comprises 28–50 wt-% vinyl acetate and the tackifying resin comprises an aromatic tackifying resin or aliphatic-aromatic resin.

12. A method of bonding at least two surfaces which comprises applying to a bondline that can join two surfaces an effective bonding amount of the adhesive of claim 1 and curing the adhesive.

13. The method of claim 12 wherein the adhesive is cured with atmospheric moisture.

* * * * *

UNITED STATES PATENT AND TRADEMARK OFFICE
CERTIFICATE OF CORRECTION

PATENT NO.  : 4,808,255

DATED       : February 28, 1989

INVENTOR(S) : VIRGINIA C. MARHEVKA et al

It is certified that error appears in the above-identified patent and that said Letters Patent is hereby corrected as shown below:

Title page:

Item [75], for "Virginia C. Markevka", read -- Virginia C. Marhevka--.

At Column 13, line 63, after the word "every" and before the word "hours" read --24--.

Signed and Sealed this

Thirty-first Day of October, 1989

Attest:

DONALD J. QUIGG

*Attesting Officer*    *Commissioner of Patents and Trademarks*